(12) United States Patent
Goychrach (10) Patent No.: US 7,540,621 B2
(45) Date of Patent: Jun. 2, 2009

(54) MULTI-SHAPE AND MULTI-COLOR CHEMILUMINESCENT DEVICE

(75) Inventor: Yuval Goychrach, Rishon LeZion (IL)

(73) Assignee: Formaglow Ltd, Arava (IL)

( * ) Notice: Subject to any disclaimer, the term of this patent is extended or adjusted under 35 U.S.C. 154(b) by 1024 days.

(21) Appl. No.: 10/672,168

(22) Filed: Sep. 26, 2003

(65) Prior Publication Data

US 2005/0068760 A1    Mar. 31, 2005

(51) Int. Cl.
*F21V 9/16* (2006.01)
(52) U.S. Cl. .................................. 362/34; 428/528
(58) Field of Classification Search ............... 428/528; 362/34
See application file for complete search history.

(56) References Cited

U.S. PATENT DOCUMENTS

| | | | |
|---|---|---|---|
| 3,539,794 A | 11/1970 | Rauhut et al. | |
| 3,720,823 A | * 3/1973 | Black et al. | 362/34 |
| 3,808,414 A | 4/1974 | Roberts | |
| 3,893,938 A | 7/1975 | Rauhut | |
| 4,814,949 A | 3/1989 | Elliott | |
| 5,171,081 A | 12/1992 | Pita et al. | |
| 5,226,710 A | 7/1993 | Giglia et al. | |
| RE35,132 E | * 12/1995 | Bay et al. | 362/34 |
| 5,557,869 A | 9/1996 | Douglas | |
| 5,860,845 A | 1/1999 | Goyhrach | |
| 6,758,572 B2 | 7/2004 | Ladyjensky | |
| 6,832,392 B2 | 12/2004 | Palmer et al. | |

* cited by examiner

*Primary Examiner*—Anabel M Ton
(74) *Attorney, Agent, or Firm*—Roach Brown McCarthy & Gruber, P.C.; Kevin D. McCarthy (57) ABSTRACT

A chemiluminescent device providing multi-shape and optionally multi-color images that comprises two fluid-impermeable polymer sheets of the same shape, sealed together at their edges to provide a space for reactants, at least one of said sheets being translucent or transparent; one absorbent sheet (pad) having essentially the same shape as said fluid-impermeable sheets and placed between them in said space; reactants capable of producing chemiluminescent effect, comprising at least one chemiluminescent compound, peroxide, solvent, and optionally one or more fluorescent dye; separation means that prevents mixing said chemiluminescent compound and said peroxide before wishing to start said effect; and partition means providing that at least one of said reactants does not reach the whole volume of said space during said chemiluminescent effect. This effect is started, and said images are created, by removing said separation means.

44 Claims, 8 Drawing Sheets

MULTI-SHAPE AND MULTI-COLOR CHEMILUMINESCENT DEVICE

FIELD OF THE INVENTION

The present invention relates to a chemiluminescent device which, due to a special compartmentalization of the reactants and due to the use of more dyes, provides multi-shape and multi-color glowing images. The invention also provides three-dimensional, multicolor, chemiluminescent glowing objects.

BACKGROUND OF THE INVENTION

Chemiluminescence is the transformation of chemical energy into visible light without incandescence. Certain chemical reactions, such as oxidation of bis(aryl)oxalates or amino phthalhydrazide with hydrogen peroxide, are accompanied by the emission of cool light, wherein the effect is facilitated in the presence of a fluorescent dye. The type of dye affects color of the emitted light; for example, 9,10-diphenylanthracene produces blue light, 9,10-bis(phenylethynyl)anthracene produces green light, and 5,6,11,12-tetraphenylnaphthacene produces red light.

Chemiluminescence is used, for example, by fireflies; however, its potential has not yet been fully utilized by humans. U.S. Pat. No. 3,539,794 describes a chemiluminescent device being a translucent container in which there are sealed compartments, separated by an easily breakable wall, wherein said compartments contain different components necessary to produce a chemiluminescent reaction. By breaking said wall, said components can mix and yield the light. U.S. Pat. No. 3,808,414 describes a device for producing chemiluminescent light, consisting of two parallel sheets divided into rectangular compartments, wherein said compartments are sealed and contain different components for providing chemiluminescent reactions. Mixing of said components is prevented by one sealing clip whose removal initiates the light production. U.S. Pat. No. 3,893,938 describes a chemiluminescent means comprising a thin substrate to which part of the reactants necessary for the reaction are bound in the form of impregnation or as capsules; the remaining reactants are provided as a fluid. The reaction, in this rather broadly claiming patent, is started by either opening a clamp divider, or rupturing the divider between compartments, rupturing said capsules, pumping or spraying said fluid onto said substrate, etc. U.S. Pat. No. 4,814,949 describes a chemiluminescent device comprising a translucent or transparent sheet having a shaped space in which one or two fragile capsules are placed, wherein said capsules contain a part of reactants necessary for the reaction, the remaining reactants being outside said capsules, said space being sealed by a second sheet. When breaking said capsules, the emitted light creates an image of said shaped space (e.g., heart- or arrow-shaped). U.S. Pat. No. 5,226,710 describes a flexible, thin, chemiluminescent device having the internal space enclosed between a translucent sheet and a polymer-laminated metal foil, wherein said space is divided into two compartments containing the reactants. U.S. Pat. No. 5,557,869 describes an artistic chemiluminescent display showing images of various shapes. Said display comprises at least one set of vials containing separate reactants, and a light control sheet into which a window is cut having a certain shape, thereby partially shading the light and creating a glowing shape. U.S. Pat. No. 5,860,845 of the present inventor describes a chemiluminescent toy in the form of a glowing balloon, comprising two balloons one inside the other with a chamber between them comprising a pad and the reactants.

The chemiluminescent devices according to the prior art have several drawbacks, one being an inadequate mixing of the components in thin layers. When removing separators between larger compartments, or when breaking capsules, the concentrations of reactants are not distributed evenly along the glowing surface, causing a non-uniform glow. A common feature of the chemiluminescent devices according to the prior art is a limited means to affect the shape or pattern of glowing surfaces. The shape of glowing surfaces is determined solely by the shape of the container in which the reactants are mixed, or by a shade with a shaped window cut into it. As for the pattern, prior art devices do not enable any effects related to variations of color or intensity of the light emitted from different parts of the glowing surface.

It is therefore an object of this invention to provide a chemiluminescent device enabling to affect the shape and pattern of images created on the glowing surface.

It is another object of this invention to provide a chemiluminescent device enabling creation of full-color images with good resolution.

It is still another object of this invention to provide a chemiluminescent device providing a uniform glow even over large areas.

It is a further object of this invention to provide a sheet capable of emitting chemiluminescent light, wherein the light creates multi-shape and multi-color images on the surface of said sheet.

This invention also aims at providing a process for the preparation of a chemiluminescent device producing multi-shape and multi-color glowing images or three-dimensional objects.

Other objects and advantages of present invention will appear as description proceeds.

SUMMARY OF THE INVENTION

This invention relates to a chemiluminescent device providing multi-shape and optionally multi-color images comprising i) two fluid-impermeable polymer sheets of the same shape, sealed together at their edges to provide a space for reactants, at least one of said sheets being translucent or transparent; ii) one absorbent sheet (pad) having essentially the same shape as said fluid-impermeable sheets and placed between them in said space; iii) reactants capable of producing chemiluminescent effect, comprising at least one chemiluminescent compound, peroxide, solvent, and optionally one or more fluorescent dyes; iv) separation means that prevents mixing said chemiluminescent compound and said peroxide before wishing to start said effect; and v) partition means providing that at least one of said reactants does not reach the whole volume of said space during said chemiluminescent effect; wherein said effect is reached by removing said separation means.

Said two fluid-impermeable sheets in a device according to this invention preferably comprise polyolefin layers 0.02 mm-10 mm thick, and a pad preferably 0.01 mm-30 mm thick. The invention provides a multi-shape image of one color when one dye is used, and it provides multi-shape and multi-color images when more dyes are used. In a preferred arrangement, three dyes are used, red and green and blue, and all other colors are formed by mixing them.

An important part of this invention is compartmentalizing the inner space of the device, and separating the reactants both before the desired chemiluminescent effect and during said effect, whereas the two separations are not the same, the latter being provided by said partition means. Said separation means comprise, preferably, capsules in which said peroxide or said chemiluminescent compound are closed before starting said effect. A preferred partition means comprises immobilizing at least one of said reactants on said pad or depositing at least one dye on said pad. A printing technique is preferably used to deposit the dyes on some or all of inner surfaces of the device, wherein for example a single dye or mixtures of dyes can be used, and the printed pattern will provide said multi-shape and multi-color image after contacting peroxide and a chemiluminescent compound. Partition means, in the device of this invention, may comprise lowering mobility of some of reactants in the device space, wherein said mobility can be, for example, lowered by increasing viscosity of liquid phases or by lowering solubility of at least one of said reactants. The preferred compartmentalization comprises a capsule array or a capsule network, wherein the use of microcapsules will provide higher image resolution. The reaction mixture, that yields the chemiluminescent effect, may comprise solution, suspension or emulsion, wherein some of said reactants may be completely dissolved or may be dissolved in emulsion droplets, or may be in the form of suspended particles, or may be entrapped in gel particles. For example, a dye may be dispersed on the pad in a dry form, whereas a peroxide is separated in one group of capsules and a chemiluminescent compound in another group of capsules; alternatively, the pad is impregnated with the solvent containing one or more components, whereas a peroxide is separated in capsules; of course, other combinations may be used in the device of this invention.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

As known in the art, a typical chemiluminescent reaction occurs in a mixture comprising a chemiluminescent compound (luminiscer), a fluorescent dye (fluorescer), a peroxide, and a solvent. Luminiscer and peroxide should be separated until the planned use. To start the illumination, all reactants are allowed to mix. Whereas the reactants in the prior art devices ultimately spread over the whole internal volume of the device, the device of this invention ensures the separation of some reactants in certain areas till the end of chemiluminescent reaction, thereby enabling creation of glowing images and structures surprisingly rich in shape and color.

This invention comprises two fluid-impermeable polymer sheets; one absorbent sheet (pad) having essentially the same shape as said fluid-impermeable sheets and placed between them in said space; reactants capable of producing chemiluminescent effect, comprising at least one chemiluminescent compound, peroxide, solvent, and optionally one or more fluorescent dyes; separation means that prevents mixing said chemiluminescent compound and said peroxide before wishing to start said effect; and partition means providing that at least one of said reactants does not reach the whole volume of said space during said chemiluminescent effect; wherein said effect is reached by removing said separation means.

A device according to this invention comprises two polymer sheets that seal off the volume in which a chemiluminescent reaction can occur, and between them a porous, absorbent, thin pad; said sheets are close to each other and the device is a quasi two-dimensional object, whose surface glows after the start of the reaction. At least one of said sheets is translucent or transparent, making the front sheet. The device can be rigid or flexible, and it may be folded in three dimensions to form various shapes. This invention is based on the controlled separation of the components during the whole reaction period, and on the controlled space variation of their concentrations. The presence of two different fluorescer dyes at two points of the reaction volume can appear as two spots on the outer surface of the device having a different color. A difference between concentrations of the reactants at two points of the reaction volume may appear as two spots of different brightness, which may be an undesired consequence of uneven mixing in the prior art applications, but which is utilized in this invention for creating an image built of many spots of different brightness and color, using the principles known in the printing technologies. The size of said spots will determine the resolution of imaging. On the other hand, a uniform glow over the total glowing area or a part of it can be achieved when desired. Said control over separation of the components, and over variation of their concentrations, is achieved by more or less delicate compartmentalization of the components inside the device, by their non-uniform deposition in the reaction volume, and by preventing their mixing. For example, a non-uniform deposition of three fluorescers on said pad can be designed so as to create a multicolor image and shape, possibly using a printing technique, which shape will appear on the outer surface of the device after contacting said pad with luminiscer and peroxide as an image glowing in many colors. The image contours will hold against blurring as far as mixing of luminiscers is prevented, which may be achieved by immobilizing said fluorescer dyes onto said pad, or obstructing free diffusion, for example by increasing viscosity in the reaction volume, or otherwise. In a preferred embodiment of the device according to this invention, non-fluorescent pigments or dyes can be used to enrich the whole multi-color and multi-shape image. For example, black pigment may be used to accentuate silhouettes of glowing shapes printed on the pad; or non-fluorescent color shapes may be printed on the inner or outer side of the front polymer sheet to be viewed in the fluorescent light of the device and complement the whole effect, matching the fluorescent colors and shapes. Parts of the front sheet, or of the pad, may be further painted with non-fluorescent dyes. The front sheet may be realized by more polymer layers, transparent or translucent, possibly differently printed.

Different painting or spraying techniques known in the art may be used for covering the pad with fluorescent dyes. The required image may be created on said pad or said sheet by arranging microcapsules filled with different color dyes, or alternatively, the image may be directly printed on the pad or sheet. The required color in the image may be achieved by using either premixed colors or separate basic colors, wherein the colors are either encapsulated or free. For example, a pink spot may be created by laying one type of capsules producing pink color, or by laying a mixture of two types of capsules—one producing red color, and the other white color.

The above said compartmentalization can be achieved, for example, by enclosing the reactants, namely luminescer, dyes, peroxide and solvent, into many capsules, with all possible combinations of reactants being inside/outside said capsules. The materials in the capsules are separated from the rest of reaction volume by a thin fragile or tearable wall. When referring to "a part of reactants", with regard to a device before the use, a part that does not contain both peroxide and luminiscer is meant. In a preferred embodiment of this invention, minicapsules are arranged in one layer on or within said pad, forming arrays or the whole network, wherein they can be deposited evenly with constant surface density, or unevenly arranged in a desired pattern, and wherein they may contain one or more reactants. In a preferred embodiment of this invention, several dyes within capsules will be dispersed on the pad surface so as to form the required color image. When necessary, the distribution of the reactants in a dense capsule network enables to reach quickly the uniform distribution of all components over the whole area after the activation, providing uniform glow over large areas of the same intended color. The device built according to the principles of this invention can exhibit uniform glow over the whole area of the device in the absence of said partition means.

The pad, in fact the glowing heart of a device according to this invention, is a porous, flexible structure, capable of retaining a part of the reactants, and preferably capable of retaining all the liquid participating in the chemiluminescent reaction. Said pad may comprise a component selected from cotton, viscose, polyolefin fibers, polyester, cellulose acetate, polyethylene glycol, polyvinyl alcohol, terephthalate, porous polyethylene fibers, porous PVC, nylon, glass fibers, cellulose, wool, or other absorptive materials, and their mixtures. The pad may resemble a material of the cigarette filter, or a cloth or paper, it can be woven or non-woven or layered, it may be chemically cross-linked or otherwise processed to be made denser or firmer or to affect fluid absorption or fluid transport. The pad may be made of transparent or translucent materials. Said pad may be free or attached to at least one of the outer impermeable sheets. It was surprisingly found by the inventor that pads made of certain materials intensify the luminescence effect, and make the illumination much stronger. Some pads even prolong the glowing time. One of the most preferred materials for making a pad in the device according to this invention is cotton fiber. Other preferred materials for making the pad are polyester-viscose and cellulose acetate. Without wishing to be limited by any particular theory, the inventor believes that some polymers, possibly including polysaccharides, may stabilize certain activated species, and/or increase the yield of the luminescence process. In choosing a material for the pad, hydrophobic or hydrophilic character of the reaction mixture, which can contain more or less hydrophobic solvents and hydrophobic reactants, will be also taken into account, having in mind that the reaction mixture should be preferably absorbed in the pad.

Some embodiments of the device according to this invention, comprising cellulose-based pads, enabled persistent fluorescent glow, that in some cases lasted for more than fifty hours, which is surprising when considering that the glowing times of prior art devices are typically several hours.

The pad should have uniform density, and should enable good contact between absorbed reactants. In preferred embodiments, most of the light will be formed on the pad surfaces. The pad may be cut to an interesting shape, and may consist of more parts that are differently processed, or that are made of different materials.

As said above, the reactants may be compartmentalized in any way, but peroxide should have no contact with the luminiscer before the use of the device. The pad may be uniformly impregnated with a part of the reactants, wherein the solvent is included or the pad is dry; or alternatively, the reactants may be deposited on/inside the pad either free or within capsules, possibly in a predetermined pattern, taking advantage of more or less limited diffusivity of the components in the pad.

The sheets enclosing the chemiluminescent device according to this invention are made of an impermeable polymer layer, preferably of a thin polyolefin layer, for example PE or PP foil. Said sheets are essentially parallel, and may be made of two or more different materials, possibly comprising multilayer system, for example PE/polyester/PE. In a preferred embodiment, the sheet on one side of the device comprises an aluminum foil, coated by a thin polymer layer preventing the contact of aluminum with the reactants. In another preferred embodiment, the non glowing of the two sheets is thicker to keep the shape of the device. The non-glowing (back) sheet may be attached to a reflective layer, such as aluminum, in order to increase the amount of light emitted through the front sheet. The inner surface of this non-glowing side may serve as a base for placing capsule arrays, or for creating small compartments within it, depressions or cavities, utilizing the thermoplastic properties of the sheet. In another preferred embodiment, both sheets are transparent or translucent and the device is glowing on both sides.

Capsules, preferably a network of minicapsules, may be attached either to said impermeable sheet or to the pad, or may be integrated into the pad or into the back sheet, possibly by heat. In one of the preferred embodiments, comprising devices tens of centimeters in size, the size of capsules is from 0.5 mm to 5 mm. Of course that for larger devices, larger capsules or other compartments may be preferable. In certain embodiments, microcapsules are preferred. The device can be activated by tearing the capsules while pulling the product through a slot which is a part of its packaging, or by other mechanical or manual squashing. In a preferred embodiment of the device, arrays of minicapsules in the device are torn by pushing an object having an interesting shape against the surface of the device, thus imprinting said interesting shape onto the device, and causing the device to glow in this shape. For example, a hand may be imprinted onto the device. Said separation means of the device according to this invention may be removed gradually in different parts of the device, so that various parts of the image may start to glow at different times. For example, the activation of the left side of the device will light up an image of mouse, and the following activation of the right side will light up an image of cat.

Said peroxide is preferably hydroperoxide, such as alkylhydroperoxide or peroxoacid, and still more preferably it is hydrogen peroxide. Said luminiscer may be selected from derivatives of oxalic anhydrides or esters, derivatives of phthalhydrazide, derivatives of acridinium dyes, triphenylimidazole, and other compounds used in the art. The examples of suitable luminiscers comprise luminol, 10,10'-dimethyl-9,9'-biacridinium salts, 3-aminophthalhydrazide, 9-chlorocarbonyl-10-methylacridinium chloride, bis(2-nitrophenyl)oxalate, bis(2,4-dinitrophenyl)oxalate, bis(2,6-dichloro-4-nitrophenyl)oxalate, bis(2,4,6-trichlorophenyl)oxalate, bis(2,4,5-trichloro-6-carbobutoxyphenyl)oxalate, bis(2,4,5-trichloro-6-carbopentoxyphenyl)oxalate, bis-N- phthalimidyl oxalate, bis(1,2-dihydro-2-oxo-1-pyridyl)glyoxal, bis(pentachlorophenyl)oxalate, bis(2-formyl-4-nitrophenyl)oxalate, bis(2,5-dinitrophenyl)oxalate, bis(2,4-dichlorophenyl)oxalate, bis(1,2-dimethyl-4,6-dinitrophenyl)oxalate, bis(2-methyl-4,6-dinitrophenyl)oxalate, and bis(3-trifluoromethyl-4-nitrophenyl)oxalate. Said fluorescer may be selected from polyaromatic hydrocarbons, such as 9,10-bisphenylethynylanthracene (green), 5,6,11,12-tetraphenylnaphthacene (red), 9,10-diphenylanthracene (purple), 9,10-bis(4-methoxyphenyl)-anthracene (blue), 1,8-dichloro-9,10-bis(phenylethynyl)anthracene (yellow), 2-chloro-9,10-bis(phenylethynyl)anthracene, and 1-chloro-9,10-bisphenylethynylanthracene.

Some luminiscers provide the luminescent effect even in the absence of a fluorescer, and in some embodiments of this invention the reactants comprise only a luminiscer, peroxide, and solvent. Said solvent may be selected from the solvents that do not interfere with the chemiluminescent effect. Esters may be used, such as dialkylphthalates, eventually combined with alcohols. Examples of preferred solvents used in a device according to this invention comprise dibutylphthalate, dimethylphthalate, butanol, etc.

Figure 1:
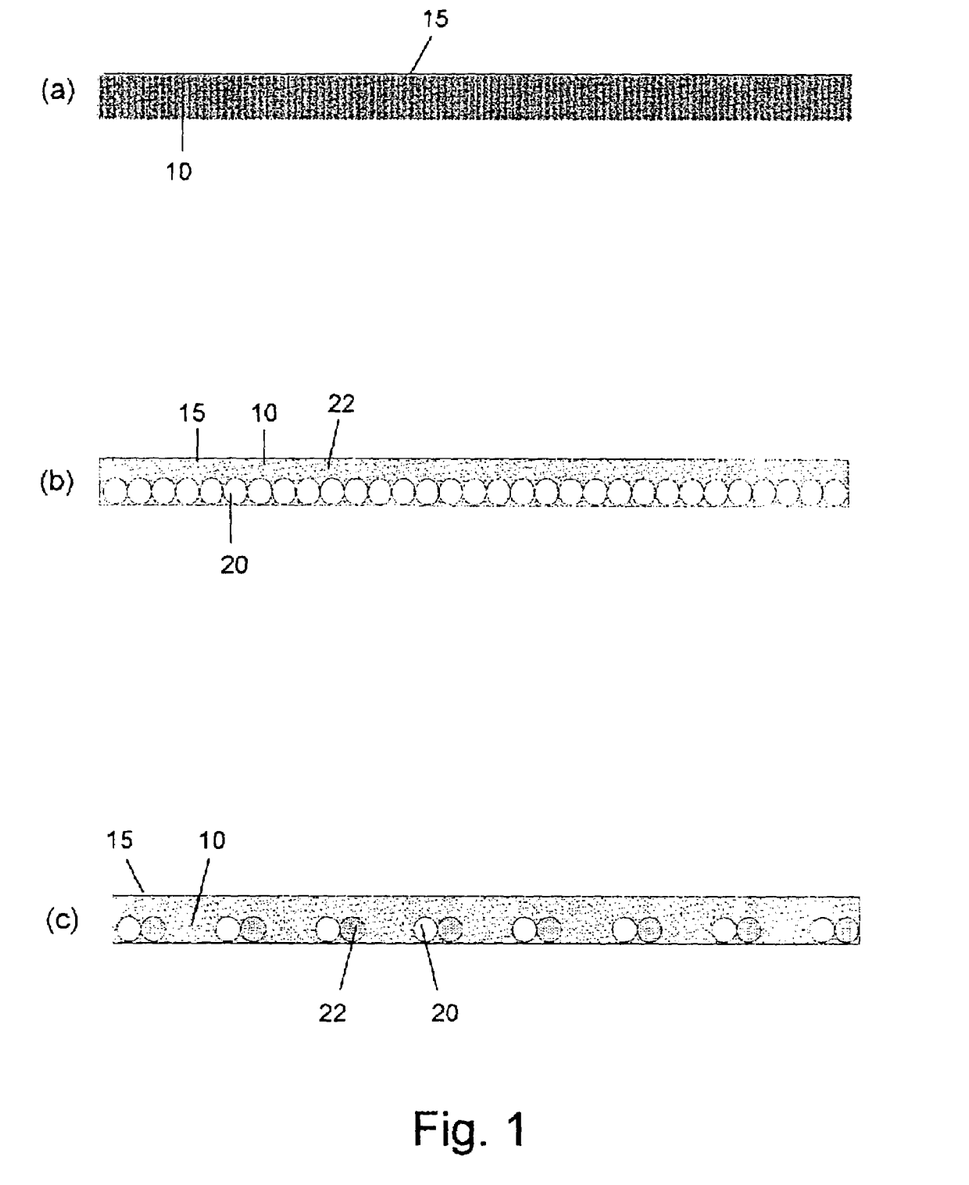
FIG. 1. shows possible distributions of the reactants between pads and capsules in the glowing sheet.

A possible configuration of components in a device according to this invention is illustrated in FIG. 1. Pad (10) is covered by outer sheet (15) (a). The pad can include capsules (circles), containing a part of reactants (20) or (22), wherein (22) may be a luminiscer, such as a solution of luminol, and (20) may be, for example, a peroxide, such as a solution of hydrogen peroxide. In one embodiment (b), reactant (22) is absorbed within the pad, and reactant (20) compartmentalized within the capsules. Reactant (22), possibly a dye, may be printed, sprayed or painted on the face surface of pad (10) in a predetermined pattern to create a picture which will glow after being contacted with reactant (20) after breaking the capsules. In another embodiment of the invention, two different components are compartmentalized within the capsules (c), while the pad is dry. The pad may be impregnated with one or more reactants, which may be achieved by soaking, immersing, or spraying, wherein finally it may be either dry or wet.

Figure 4:
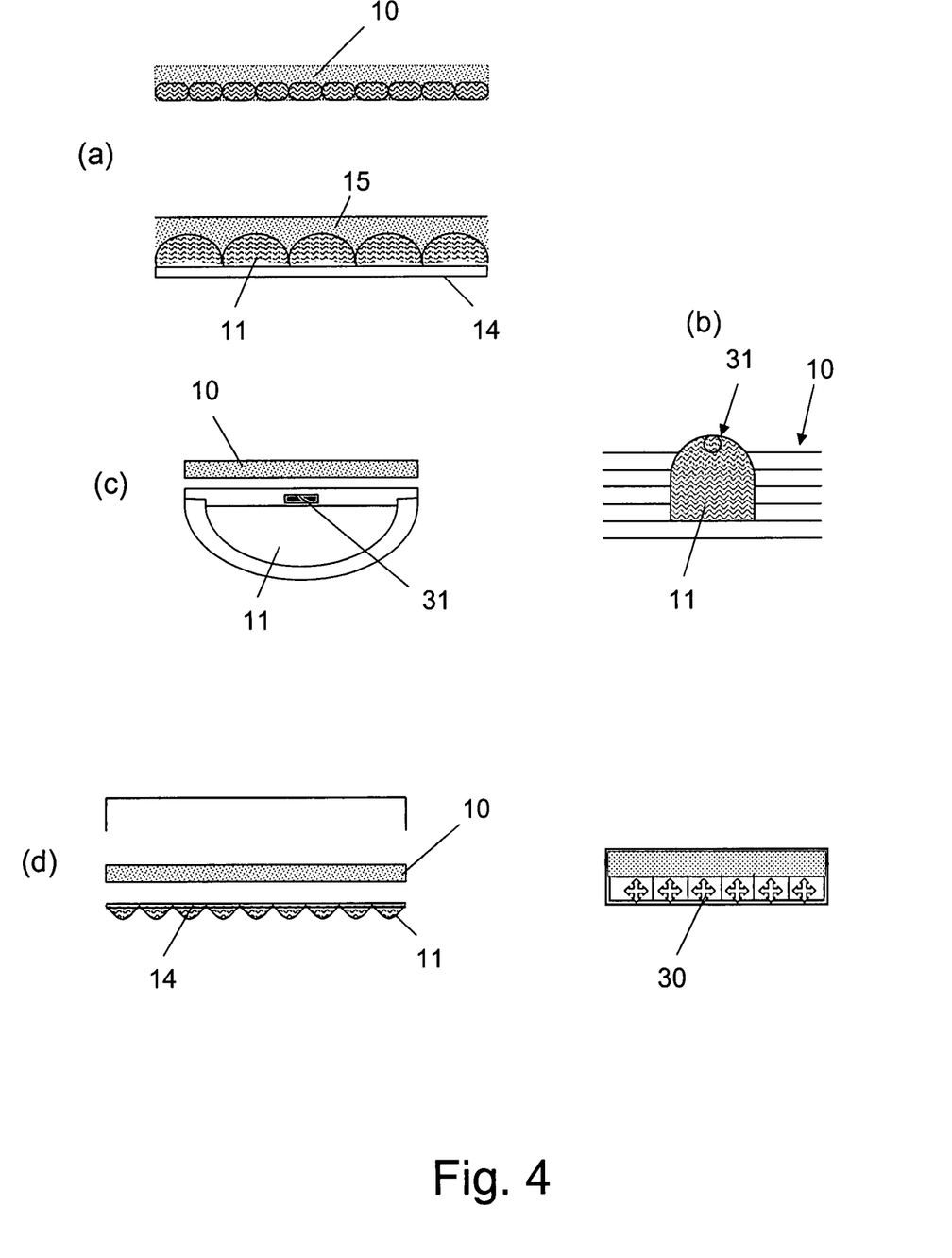
FIG. 4. shows possible structures of the capsules.

Whenever the term capsule is used, a small part of the reaction volume between two outer surfaces of the device is meant, wherein said small volume is separated from the rest of the reaction volume by an impermeable wall or membrane, or other obstacle to a free diffusion of reactants. The capsule may be attached to the pad or to the inner surface of the device, or may be created inside the pad or inside the sheets (FIG. 4). The inner surface of the device can be a part of said capsule. The capsule may have a form of a bubble, ampoule, a hollow grain, and may comprise thin glass, polymer, metal foil laminated with a polymer, or other materials that are inert and insoluble in the inner environment of the device. A preferred layer, closing a reactant within a capsule, and providing a barrier to the light and moisture, is a laminated aluminum foil, shown as (14) in FIG. 4a. The total capsule volume is designed so as to enable the necessary reactant amounts. In the case of the soft capsules, a gas entrapped inside, or a gas formed during the storage of the device, may inflate the capsules, and the overpressure may assist in rupturing the capsules upon activation of the pad device. A spike within the capsules, like spike 30 in FIG. 4d, or a weak point 31 in FIGS. 4c and 4b, assist in rupturing the capsule (11) within the pad (10). The capsules can be filled completely when necessary. An "air-bubble" sheet used in packaging fragile items, with the bubbles filled by reactant solutions, may serve as a model of a capsule network, the bubbles possibly being coated with thin aluminum foil, EVOH, etc. Reactants (20) and (22) can be stored in two different types of capsules, leaving pad (10) either soaked with pure solvent or dry (FIG. 1). For connecting or sealing the polymer components of the device of this invention, techniques known in the art are used, including welding, soldering, heat sealing, gluing, etc. In arranging microcapsules upon the pad or the inner surface of the device, techniques known, for example, in the electronic industry, may be used. Controlled capsule implantation on a smooth surface may be used, either with or without gluing, whereas the capsules may be soft or hard, and thermally inflating polyethylene can be comprised, gas or liquid injection or vacuum pumping can be employed, as well as heat molding, injection and quenching gelatin capsules, and other encapsulation methods.

As mentioned above, said translucent or transparent outer sheet may be printed on its surface to contribute still more to the complexity of the whole effect, providing a picture or characters seen in the passing fluorescent light, and modifying or complementing the fluorescent image. In a preferred embodiment, the device glows on both sides. Two sides of the device of this invention may show different images. In one embodiment, the pad is a nontransparent layer having two different patterns printed with fluorescent dyes on its two sides, providing two different glowing images seen after the activation through two transparent outer sheets. In another embodiment of the glowing device according to this invention showing two different pictures on each side, two transparent or translucent outer sheets comprise two different pictures, which may be printed or painted or sprayed on these sheets, or which may be placed on said sheets in the form of stickers. Said stickers may be pre-prepared according to the instantaneous need or on a client's order.

Figure 2:
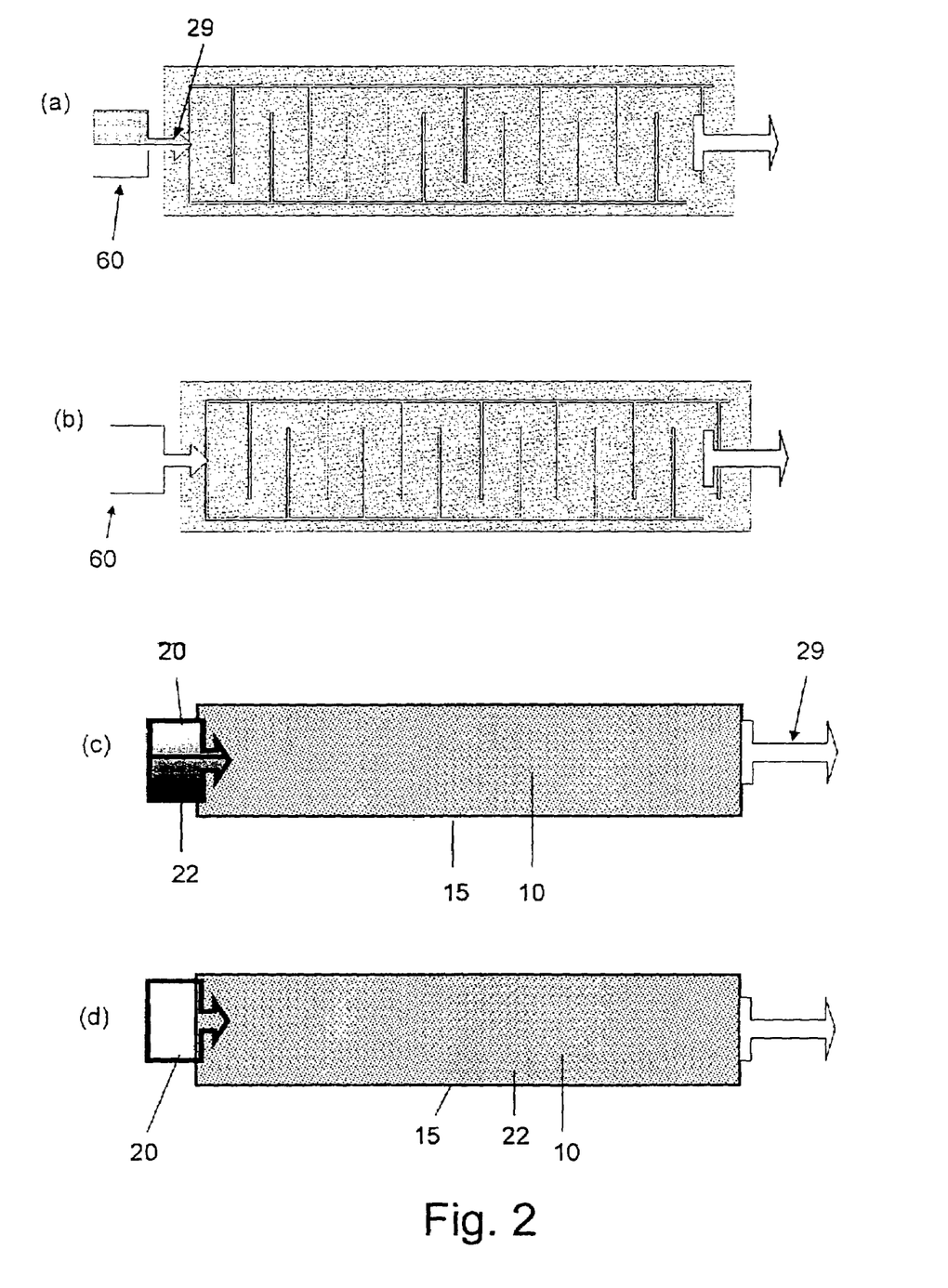
FIG. 2. shows a possible separation of liquid reactants during storage of the glowing sheet.

In another embodiment, as shown in FIG. 2, two reactants (FIG. 2a), or one reactant (FIG. 2b), are stored in separate chambers (60), and during the device activation they are simply pushed or sucked, for example by a syringe (29), into the reaction volume. Reactants (20) and (22) are pumped to the desired areas via tubing, wherein the system is provided by a snap lock or other means to prevent any leakage of the liquids from the device. Said tubing may also provide mechanical support to the device, and may help in creating 3D forms, possibly comprising hollows or other complex features. Said chamber and syringe, or other disposable parts, are disposed of after the activation of the device. In another embodiment, the liquid reactants are pushed or sucked without the inner tubing, as shown in FIGS. 2c and 2d.

Figure 3:
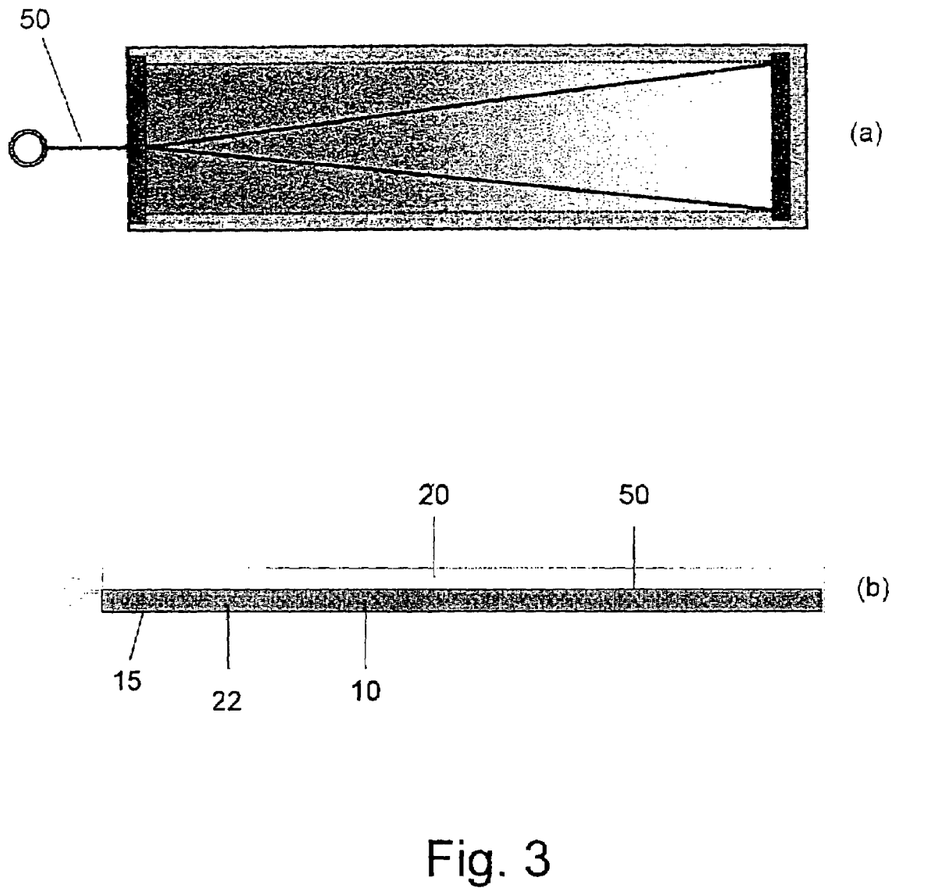
FIG. 3. shows a possible compartmentalization of reactants in the glowing sheet.

Reactants (20) and (22) can be separated during the storage by a separator as shown in FIGS. 3a and 3b. Buffer (50) keeps the reactants from mixing until the moment of planned activation. The buffer divides the reaction volume into two separated parts. After pulling said buffer, a snap lock will prevent liquids from leaking.

Figure 5:
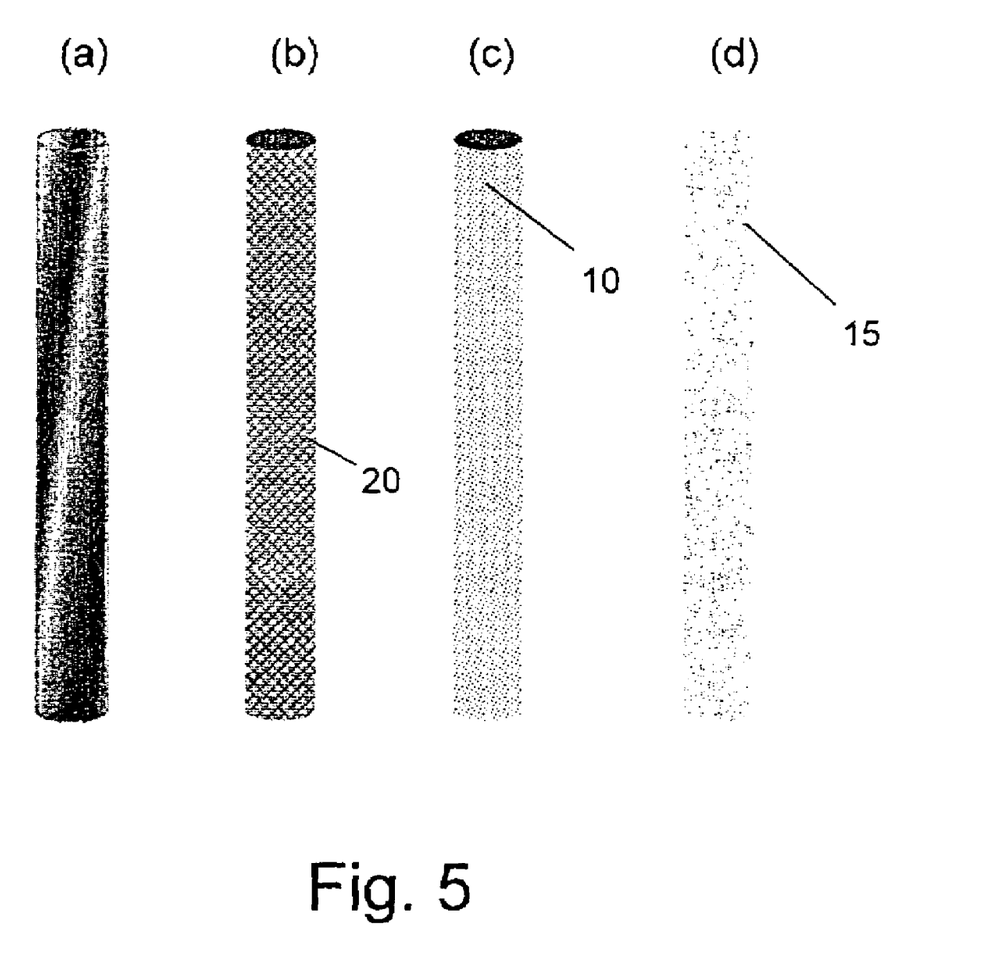
FIG. 5. is an expanded view of a glowing cylinder.

The device of this invention is not limited to planar objects, but can have other shapes to which a thin, quasi two dimensional, object can be folded or warped, such as cylindrical. In a preferred embodiment, a planar device is first activated to start the glow, and then folded in a three-dimensional shape. In another preferred embodiment, the cylindrical device first created, and then activated when desired. A cylindrical device is made by gradual creating the layers on a cylinder. The structure of a cylindrical device is shown in FIG. 5. First, the inner rigid PP cylinder is formed (a), then a capsule layer is created (b), followed by a pad (c), and the outer transparent sheet (d).

The device according to this invention may be provided with an external pre-testing indicator of the quality and freshness of the product.

In a preferred embodiment, microcapsules are used having a size less than 0.2 mm. For creating microcapsule arrays or networks, microencapsulation processes known in the art are used, producing liquid-containing microcapsules. For example, hardened gelatin, urea-formaldehyde, polyacrylate, vinyl type polymers, inorganic silica, or glass microcapsules, and the like are used, taking into consideration the stability of the material in the inner environment of the device.

Thus the present invention is directed to a device comprising two outer impermeable polymer sheets, an inner absorptive sheet, reactants placed within said two sheets enabling a chemiluminescent reaction, a separation means that prevents mixing luminescer with peroxide before switching on the illumination, and a partition means preventing at least one of the reactants from reaching the whole inner volume of the device; which device provides chemiluminescent images that are multi-shaped and optionally multi-colored. A device according to this invention can be used in the domains of security, life saving and signaling services, control, amusement, advertising, lighting, emergency lighting, lighting in case of fire and explosion hazard, areas without energy supplies, yachts, airplanes, night diving, fighting troops, replacement of electricity, etc.

Figure 6:
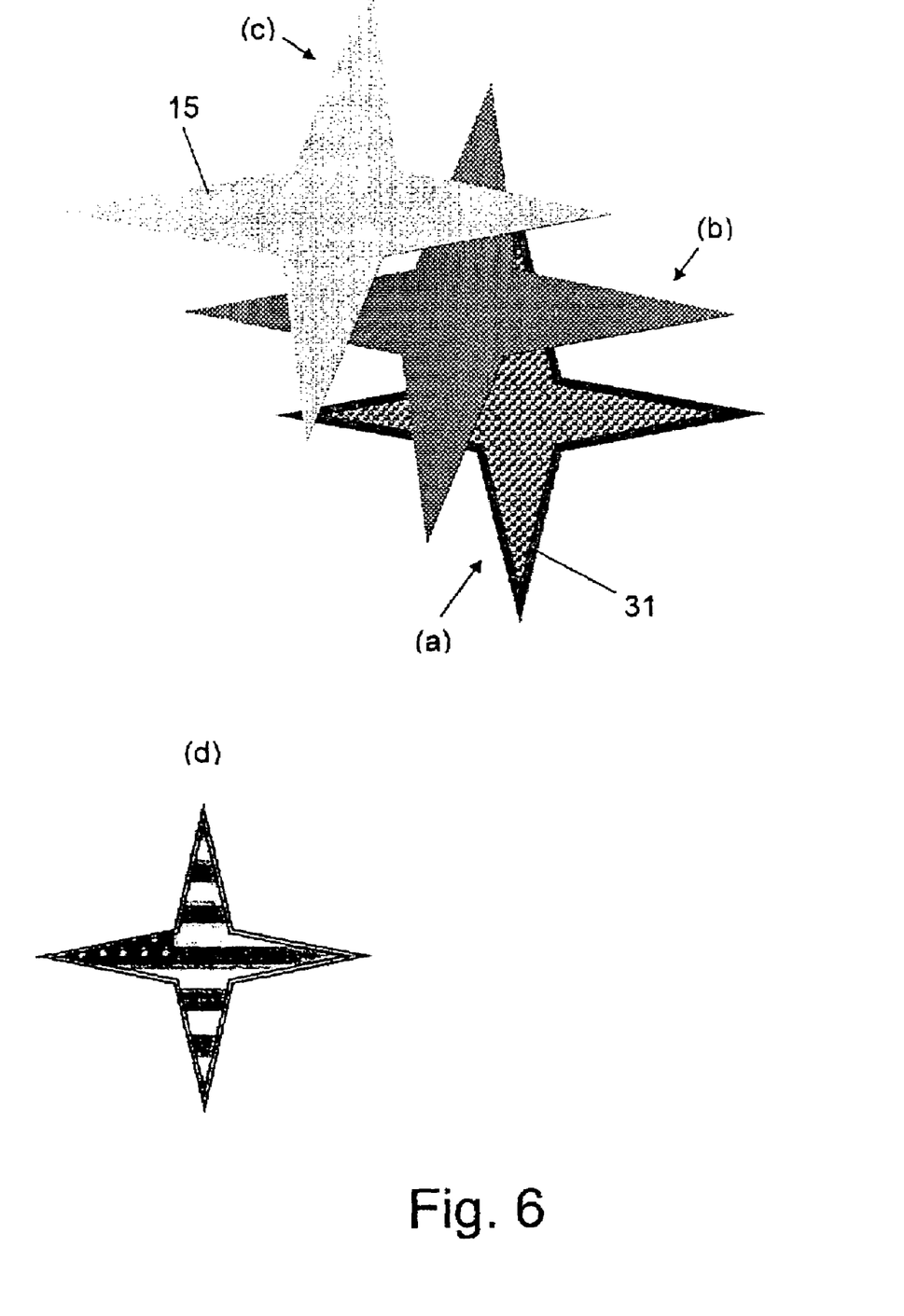
FIG. 6. shows an expanded view of a glowing multi-shape and multi-color article.

In a preferred embodiment of this invention, the emergency lightning is activated automatically in case of a power break in the dark areas, for example in the form of wall information posters, such as glowing instructions, arrows, etc. The poster may be wound in a box with a slot, and in case of a power break, weights are released, unwinding the poster and drawing it out of the box through the slot, breaking capsules and activating the device; alternatively, said released weights initiate pumping a reactant into the device, activating it, etc. FIG. 6 shows an example of the glowing, multi-color and multi-shape device (d), created from a PP layer, possibly comprising capsules (a), a pad impregnated with a luminiscer with the image printed on it with fluorescent dyes (b), and a transparent front layer (c).

Figure 8:
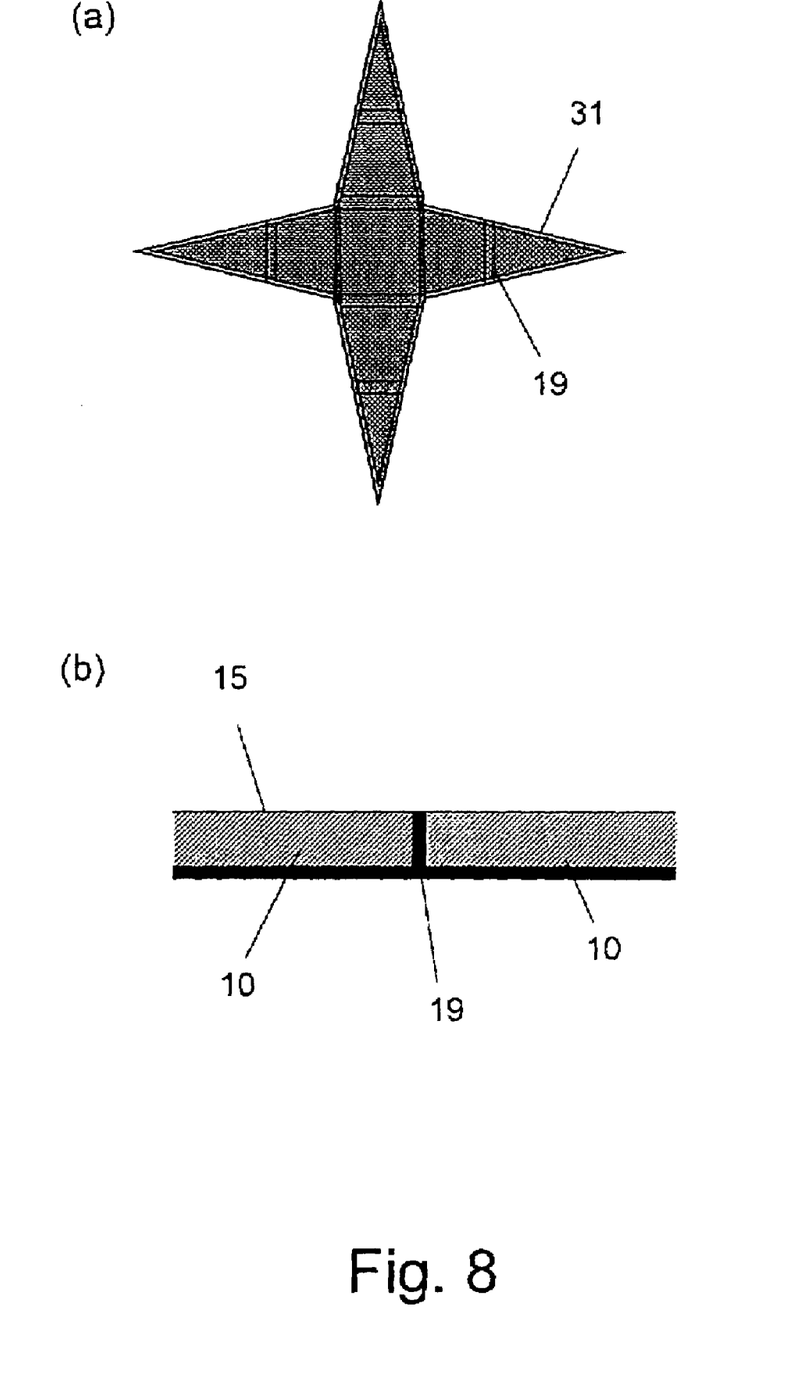
FIG. 8. shows a division of the pad and the reaction volume in more parts.

Said two outer impermeable sheets, enclosing the device, are fused at the edges (of their surface) to seal the reaction volume for the chemiluminescence reaction, see (31) in FIG. 6. Said two sheets may be further fused along certain lines within the surface of the sheets, thus forming seams along the device which, being a thin quasi two-dimensional object, can be easily folded in three dimensions. The fused areas may have the form of thin lines or wide stripes, such as 19 in FIG. 8. Said seams divide the reaction volume of the device into more unconnected parts. Similar results may be obtained by gluing or welding more devices together. Whether comprising said seams or not, a device according to this invention, thin and quasi two-dimensional, may be folded in three dimensions, when both outer sheets are sufficiently thin and flexible. In a preferred embodiment, a device according to this invention is a three dimensional object glowing in many colors, and exhibiting on its surface various shapes, characters, etc. An example of such an object is a toy having the shape of an animal. When combining more objects, including, for example, planar object comprising seams or a cylindrical one, which objects can be connected and interwoven in many ways, unlimitedly complex structures, glowing in many colors, may be built.

Figure 7:
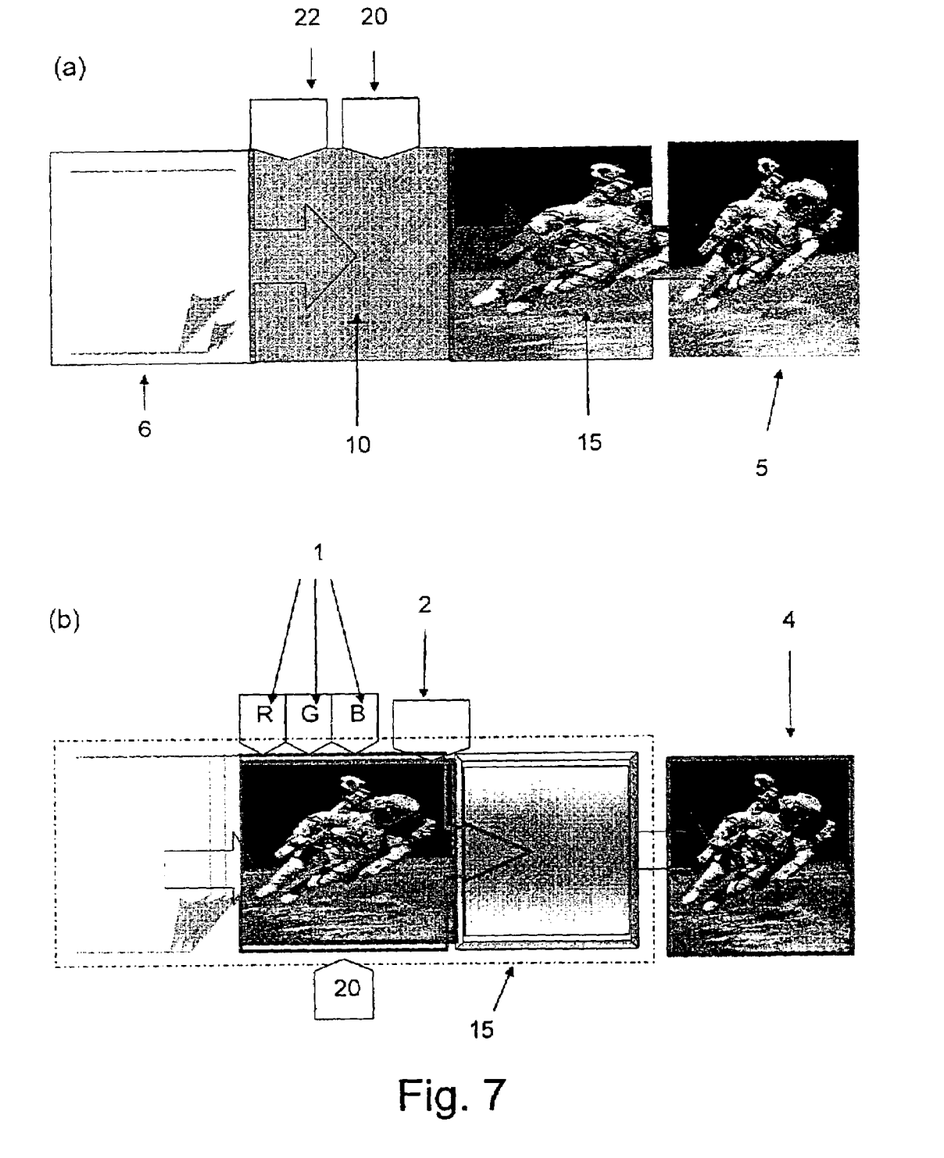
FIG. 7. schematically shows a process for the instant preparation of a glowing device.

A device according to this invention may be easily prepared on the spot, for example enabling spontaneously required pictures to be created for clients at public entertainment occasions. In one embodiment, such picture is printed on the outer impermeable sheet, and is seen in the passing fluorescent light. In another embodiment, such picture is printed or painted on the pad, using fluorescent and luminescent materials. Thus, this invention is also directed to a process for the preparation of a chemiluminescent device, comprising i) providing an absorbent pad in the form of a thin sheet; ii) printing or painting or spraying a required shape on the surface of said pad, optionally using materials capable of producing chemiluminescent effect; iii) contacting said sheet with one or more reactants necessary for producing chemiluminescent effect, which contacting comprises impregnating, soaking, immersing, or spraying; and iv) closing said sheet between two fluid-impermeable polymer sheets of a shape similar to the shape of said pad, at least one of said sheets being translucent or transparent. Said material may comprise a compound selected from the group consisting of chemiluminescent compounds, fluorescent dyes, and their mixture. Said process is preferably automated, and includes taking said pad from a pad stack, creating on the pad a picture, possibly according to an instant order of a client, treating the pad with a peroxide, and sealing the pad within an impermeable plastic bag. Said stack may look, for example, like a stack of paper pieces, or like a roll of paper, and the pads may indeed comprise cellulose. Said automatic process can provide on the spot a device in the form of a glowing picture, possibly as a ticket, label, tag, advertisement, or personal identification for a short-term occasion, which occasion may be a performance, disco, entrance to a shopping centre, or entrance to a meeting or a congress. Said automatic process may be carried out using a standard printer modified for printing on a pad, and may comprise more chambers with the reactants. In one embodiment, as schematically shown in FIG. 7a, a peroxide (20) and a luminiscer (22) are applied separately in catridges, wherein a fluorescer may be mixed with either of them, onto the pad (10) taken from the stack or roll (6), or the pad may be pre-soaked with some of reactants, and a non-fluorescent picture is printed on the cover sheet (15) that is finally attached over the pad, and the picture (5) is illuminated by the emitted luminescence. In another embodiment, FIG. 7b, the pad is gradually printed with three luminescent dyes having three basic colors (1), and with black pigment (2), and then it is covered with transparent sheet (15), producing the glowing device (4). Of course, said device prepared on the spot, for instantaneous needs, as described above, may be adjusted so as to produce a device that can be activated anytime later, according to the need; the treatment of the pad by a peroxide may be avoided, and one or more minicapsules containing peroxide may be glued during the preparation process onto the pad to be broken later.

While this invention has been described in terms of some specific examples, many modifications and variations are possible. It is therefore understood that within the scope of the appended claims, the invention may be realized otherwise than as specifically described.

I claim:

1. A chemiluminescent device providing multi-shape images comprising
  i) two fluid-impermeable polymer sheets of the same shape, sealed together at their edges to provide a space for reactants, at least one of said sheets being translucent or transparent;
  ii) one absorbent sheet (pad) having essentially the same shape as said fluid-impermeable sheets and being placed between them in said space, said pad being from about 0.01 mm to about 30 mm thick;
  iii) reactants capable of producing chemiluminescent effect, comprising at least one chemiluminescent compound, peroxide, solvent, and one or more fluorescent dye;

iv) separation means that prevents mixing said chemiluminescent compound and said peroxide before wishing to start said effect, the separation means being attached either to said fluid-impermeable sheets or to said pad, thereby acquiring a fixed position with said space provided by said fluid-impermeable sheets; and v) partition means providing that at least one of said reactants does not reach the whole volume of said space during said chemiluminescent effect;

wherein said effect is started, and said images are created, by removing said separation means.

2. A device according to claim 1, wherein said pad comprises a component selected from the group consisting of cotton, viscose, polyolefin fibers, polyester, cellulose acetate, polyethylene glycol terephthalate, glass fibers, cellulose, porous PVC, and their mixtures, wherein said component can be woven, non-woven, layered, and further can be chemically cross-linked or modified.

3. A device according to claim 1, wherein said fluorescent dye is an unsubstituted or substituted polyaromatic hydrocarbon, and said peroxide is a hydroperoxide.

4. A chemiluminescent device according to claim 1 providing multishape image, wherein said reactants comprise no dye or one dye.

5. A device according to claim 1, wherein said separation means comprise at least one capsule in which said peroxide or said chemiluminescent compound are closed before starting said effect.

6. A device according to claim 1, wherein said partition means comprises the division of said pad into more unconnected parts.

7. A device according to claim 1, wherein said partition means comprises immobilizing at least one of said reactants on said pad.

8. A device according to claim 1, wherein said partition means comprises lowering mobility of some of reactants in said space.

9. A device according to claim 8, wherein said mobility is lowered by lowering solubility of at least one of said reactants in said solvent.

10. A device according to claim 1, wherein said space is compartmentalized, and said reactants are separated in different compartments.

11. A device according to claim 10, comprising a capsule array or network.

12. A device according to claim 10, comprising a network of microcapsules.

13. A device according to claim 11, wherein the capsule distribution ensures the control over the intensity and color of the light emitted from the whole area of said device.

14. A device according to claim 11, wherein the capsule distribution ensures the uniform glow from the whole area having the same intended color.

15. A device according to claim 1, wherein said reactants are separated in different phases.

16. A device according to claim 1, wherein said separation means are not removed simultaneously in the whole device, so that different parts of the image start to glow at different times.

17. A device according to claim 1, wherein said translucent or transparent sheet is printed on its surface providing a picture or characters seen in the passing fluorescent light, and modifying said fluorescent image.

18. A device according to claim 1, wherein said pad or two sheets have patterns or pictures created on them by non-fluorescent dyes and pigments, enhancing the complexity of said image.

19. A device according to claim 18, wherein said patterns or pictures are printed on the inner or outer sides of said sheets or on one or both sides of said pad.

20. A device according to claim 1, wherein a translucent or transparent sticker is placed on the outer side of said sheets.

21. A device according to claim 1, glowing on both sides.

22. A device according to claim 21, showing different images on said two sides.

23. A device according to claim 1, wherein one of said two sheets comprises a reflexive layer.

24. A process for the preparation of a chemiluminescent device according to claim 1, comprising i) providing an absorbent pad in the form of a thin sheet, said pad being from about 0.01 mm to about 30 mm thick;

ii) creating a required shape on the surface of said pad;

iii) contacting said sheet with one or more reactants necessary for producing chemiluminescent effect, which contacting comprises impregnating, soaking, immersing, or spraying; and iv) closing said sheet between two fluid-impermeable polymer sheets of a shape similar to the shape of said pad, at least one of said sheets being translucent or transparent.

25. A process according to claim 24, wherein said creating comprises printing or painting or spraying or immersing.

26. A process according to claim 24, wherein said material comprises a compound selected from the group consisting of chemiluminescent compounds, fluorescent dyes, and their mixture.

27. A process according to claim 24, which is automated, taking said pad from a pad stack, or cutting said pad from a pad roll, printing on the pad a picture, according to an instant order of a client, wetting the pad in said peroxide1 and sealing the pad within an impermeable plastic bag.

28. An automatic process according to claim 24, providing on the spot a device in the form of a glowing picture, as a ticket, label, tag, advertisement, or personal identification for a short-term occasion.

29. An automatic process according to claim 24, providing on the spot a device, as a ticket, label, tag, advertisement, or personal identification, that can later be activated to show a glowing image.

30. An automatic process according to claim 28, wherein said occasion comprises a performance, disco, entrance to a shopping place, or entrance to a meeting or congress.

31. A device according to claim 12, wherein the capsule distribution ensures the control over the intensity and color of the light emitted from the whole area of said device.

32. A device according to claim 12, wherein the capsule distribution ensures the uniform glow from the whole area having the same intended color.

33. A device according to claim 1, wherein said multishape images comprise more colors.

34. A chemiluminescent device according to claim 33 providing multishape and multi-color images, wherein said reactants comprise two or more dyes.

35. A chemiluminescent device according to claim 33 providing multishape and multi-color images, wherein said reactants comprise three dyes having red, green, and blue colors, from which all other colors are formed.

36. A chemiluminescent device according to claim 33 providing multishape and multi-color images, in which the color-forming dyes are pre-mixed before said effect is started.

37. A device according to claim 33, comprising depositing at least one dye on said pad.

38. A device according to claim 37, wherein said depositing is performed by using a printing technique.

39. A device according to claim 38, wherein at least one dye is deposited to create a pattern that can glow after contacting said pad with said peroxide and said chemiluminescent compound.

40. A device according to claim 38, wherein three dyes having red, green, and blue colors are used to enable forming all colors according to the additive system, and to create multi-color glowing image after contacting said pad with said peroxide and said chemiluminescent compound.

41. A device according to claim 1, wherein one of said impermeable sheets is coated with an aluminum foil.

42. A process according to claim 24, wherein one of said impermeable sheets is coated with aluminum foil.

43. A device according to claim 1 wherein said two fluid-impermeable sheets comprise polyolefin layer 0.02 mm to 10 mm thick.

44. A device according to claim 1, wherein said separation means comprise capsules that cannot freely move inside the device, and that are attached to said impermeable sheets or to said pad.

* * * * *